TELEVISION RECORDING METHOD AND APPARATUS

Filed Oct. 7, 1947 3 Sheets-Sheet 1

INVENTOR.
Paul Raibourn
BY Darby & Darby
ATTORNEYS

INVENTOR.
Paul Raibourn
BY Darby & Darby
ATTORNEYS

Aug. 23, 1955 P. RAIBOURN 2,716,154

TELEVISION RECORDING METHOD AND APPARATUS

Filed Oct. 7, 1947 3 Sheets-Sheet 3

INVENTOR.
Paul Raibourn
BY Darby & Darby
ATTORNEYS 2,716,154
Patented Aug. 23, 1955

2,716,154

TELEVISION RECORDING METHOD AND APPARATUS

Paul Raibourn, Southport, Conn.

Application October 7, 1947, Serial No. 778,307
18 Claims. (Cl. 178—7.4)

This invention relates to apparatus and method for the transformation of variable recurrent complex signals of one recurrency rate to a variable recurrent complex signal of a different recurrency rate and particularly to apparatus and method for reproducing television images recurring at one rate to television images recurring at a different rate as for photographing television images on motion picture film.

It is often desirable, for various reasons, to record on a motion picture film the signals which appear on the screen of a cathode ray tube of a television receiver. For one thing, this provides a simple and effective method for projecting a television image on an enlarged screen of a motion picture theater. Also, it has been found desirable to record on a motion picture film the television images for purpose of retaining, or filing for future use, the scene or program which has been televised. A number of problems have arisen in connection with systems for reproducing on the film the scenes on the screen of the cathode ray tube. A number of systems have been proposed for overcoming these problems, which, though satisfactory in some respects, do not provide a commercially satisfactory picture on film, due to problems of synchronization between the elements, and lack of precise timing.

It is well known that a motion picture film is in reality a plurality of consecutive still shots taken at a standard rate of twenty-four pictures per second. When the film representations are reproduced on a screen by means of a projector, the comparatively high rate of twenty-four scenes per second produces the illusion of continuous motion. There has been no problem in the motion picture art for taking pictures in this manner of an ordinary scene, because there is a continuous reflection of light from the object being photographed.

A television image is reproduced on the screen of a cathode ray tube by means of a series of individual traces progressing horizontally and vertically across the face of the tube and retracing their path at a high rate so as to produce on the screen the illusion of a continuous picture, the high rate of tracing being indiscernible to the eye. Thus, in a television picture, as in a motion picture film, there is in reality a plurality of consecutive individual pictures appearing on the screen of the tube. It is now standard practice in the television art to produce a complete television frame or picture of 525 horizontal traces across the face of the tube thirty times per second.

From this brief description of the two systems it is apparent that twenty-four consecutive pictures appear in any one second on a motion picture film, while thirty consecutive pictures appear in any one second on a television screen. Thus, in reproducing television images on a photographic film, the scene being photographed is interrupted thirty times per second. It is readily apparent that a single picture—which is commonly known as a "frame" in both the television and motion picture arts—appears one and a fraction times on the television screen during the time of the taking of one frame on the motion picture film. Thus, the individual frames in the motion picture film will contain a portion of the scene retraced on the television screen. Undesirable effects are noticed on the film picture as the result of this retracing, which is highly objectionable from an entertainment standpoint.

Prior systems have been disclosed for blanking the television picture during the time the film in the motion picture camera is moved between frames. This avoids the occurrence of more than one television frame on one motion picture film frame. Because of the many variations and minor irregularities in mechanical motions, imperfect synchronization often resulted. Further, in such systems both the television transmitter, receivers, and cameras have normally operated from a common local sixty-cycle power line and to some extent solved one of the synchronizing problems since all elements operated from a single power source. Thus, to some degree, synchronization between the motion picture film and the television screen has been obtained. These prior systems are not commercially satisfactory when the television transmitter is being operated from a separate power source in a different locality. This is due to the fact that while both localities operate on a sixty-cycle basis, there is not complete synchronization between the power lines which is necessary for the high degree of synchronization required for commercial operation of television motion picture transformation systems. Perfect synchronization between television frame frequency, electronic or mechanical shutter speed, and camera motion speed is essential. The necessity for perfect synchronization is apparent if one considers that an error of sixty-three millionths of a second will result in an error of one full television line.

It is inherent that to record a television signal on a standard camera, allowance must be made for pull down time and motion picture repetition rate must be below television rate to allow for movement of film. Therefore, it is an object of this invention to provide an improved method and apparatus for recording television pictures on a motion picture film. It is another object to provide a method and apparatus for obtaining synchronization between the elements involved in the recording of television pictures on a motion picture film. It is a further object to provide a method and apparatus for controlling precisely the on time of the cathode ray tube in the television receiver during the exposure of each film frame, the pulse blanking the cathode ray tube during the pull down time of the film in a motion picture camera, and restoration of the television picture at the end of such pull down time.

Other objects will be apparent after a study of the following description, claims, and drawings, in which Figure 1 is a block diagram of the basic elements involved in the system according to this invention;

Figure 1:
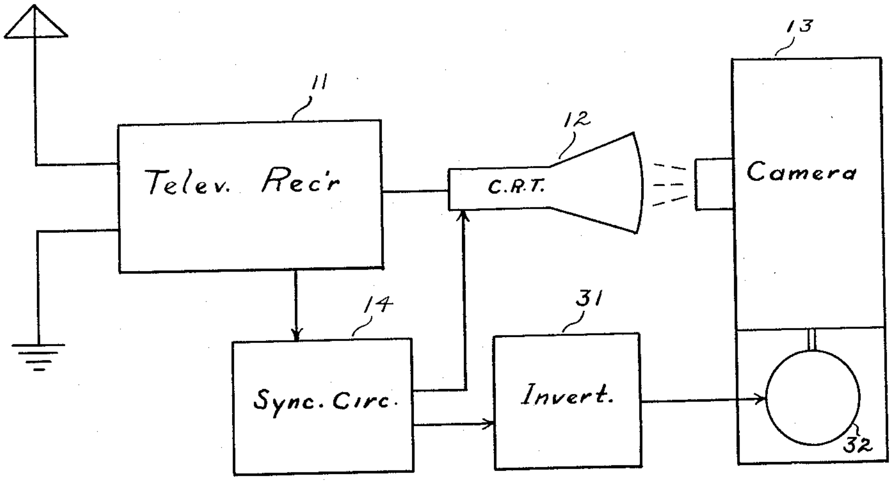

Referring now in more detail to Figure 1, it may be seen that there is provided a television receiver 11 which may be any standard commercial television receiver. Such a television receiver receives the transmitted video signals from a distant transmitter and reproduces the signals on the screen of a cathode ray tube 12. The image produced on the screen of the cathode ray tube 12 is photographed on a motion picture film by means of the camera 13. The motion picture camera 13 may be any standard camera having a film pull down time which is less than 1/120 of a second, or 1/24 part of a second less 1/30 of a second. It is preferred that the mechanical shutter system be removed so that the film is continuously exposed, even during the pull down period.

In order that the image on the tube 12 may be completely blanked out during the pull down time of the motion picture film in the camera 13, there is provided a synchronizing circuit 14. Circuit 14 preferably acts on tube 12 by applying a bias voltage to the grid of the tube so as to interrupt the electron stream of the tube and thus blank out the picture on the screen thereof. For the purpose of obtaining precise timing of this blanking out period, the synchronizing circuit 14 derives its trigger or operating voltage from the received horizontal synchronizing pulses of the television receiver.

The invention is illustrated and described herein in connection with present day television standards of 525 lines and a frame rate of 30 cycles per second. It will be understood that the apparatus and method of the invention is equally as applicable to other television standards using other line or frame rates.

Figure 2:
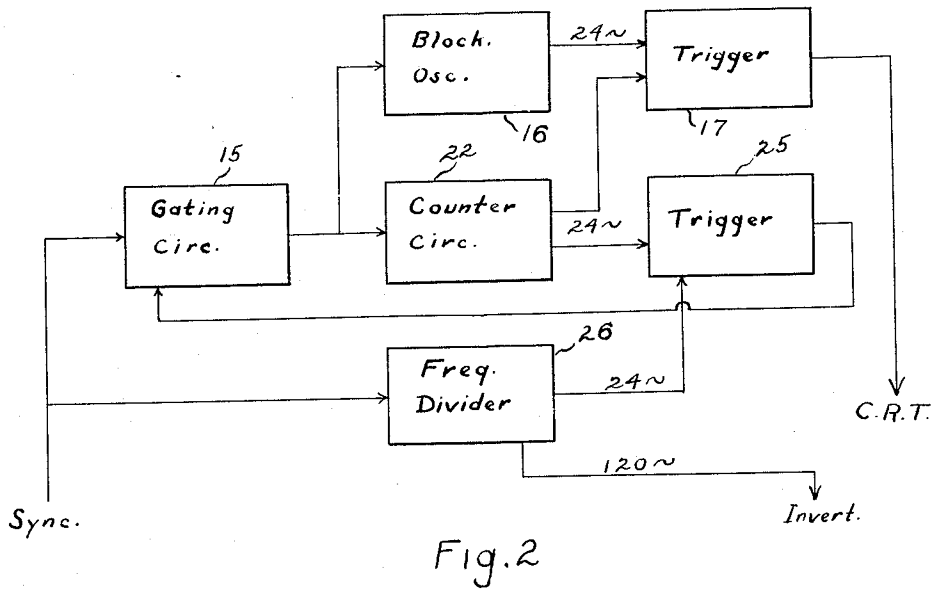
Figure 2 is a diagram in block form of the elements involved in the circuit operating from the horizontal synchronizing pulses of the television receiver of Figure 1.

The circuit 14 is shown in more detail in Figure 2. A portion of the horizontal synchronizing pulses received by the television receiver 11 is fed to a gating circuit 15. The gating circuit 15 may be keyed by a square wave generator, for instance, and is in itself a type of circuit well known in the electronics art. A gating circuit of this type is illustrated on pages 407–413 of the book "Principles of Television Engineering" by Fink, published by McGraw-Hill in 1940, or the RCA Review of July 1940 at page 64.

Figure 3:
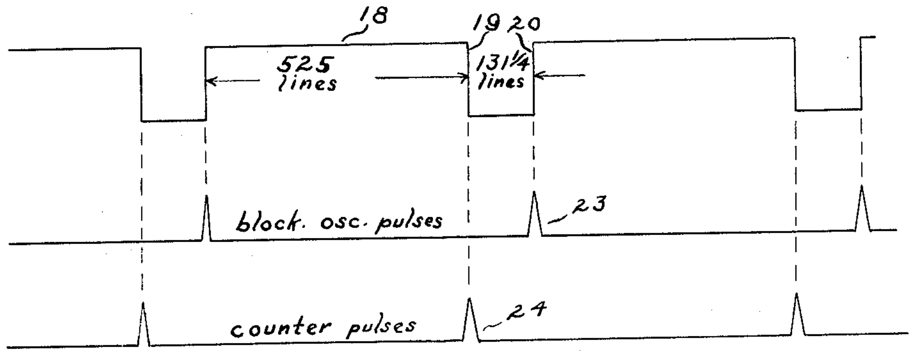
Figure 3 illustrates the electrical wave forms involved in the circuit of Figure 2.

The output from the gating circuit 15 is fed to a blocking oscillator circuit 16. The circuit 16 is preferably a blocking oscillator of the well known single swing type, and, again, is in itself well known in the art. Such a blocking oscillator circuit is illustrated on page 155 of the Fink book referred to above, in United States Patent No. 2,137,010. Any circuit which will produce a single wave and then immediately cut off, may be used, however. The first horizontal synchronizing pulse received through the gating circuit fires or actuates the blocking oscillator 16. The pulse of the blocking oscillator 16 is fed to a trigger circuit 17 which may be a flip-flop type of square wave generator. The circuit 17 consists preferably of two tubes connected so that when the potential of the plate in one tube is high, the potential of the plate in the other tube is low. This is a steady state condition. If a pulse is received by such a circuit, the plate potentials reverse, as is well known, and the circuit will remain in this second condition until a second pulse is received, at which time the potentials again reverse. A trigger circuit of this type is described and illustrated on pages 168–174 of the book "Ultra-High Frequency Techniques" by Brainard. The wave form produced by the trigger circuit 17 is shown at 18 in Figure 3. As may be seen, the curve 18 in Figure 3 is a graph of voltage or potential against time. The output voltage of the circuit 17 in steady state condition suddenly drops, as seen at 19, when a trigger pulse is received. A second received trigger pulse will cause the output to rise suddenly, as seen at 20, to the original steady state voltage condition.

The voltage represented by the wave form 18 of Figure 3 may be applied to a cathode ray tube in a well known manner to blank out the electron stream at periodic intervals represented by the dip 19—20 of Figure 3. The image on the cathode ray tube is faithfully reproduced during the steady state condition of the trigger circuit 17.

As mentioned previously, a single frame or image of a standard television picture comprises 525 horizontal lines. According to this system, the television tube is blanked out at the end of 525 pulses. In order that this blanking out may take place at a precise time at the end of 525 lines, we have provided a counter circuit 22. The counter circuit 22 is a standard circuit well known in the art which produces a single output pulse at the end of a predetermined number of input pulses. Such a counter circuit is available and is disclosed in United States Patent 2,574,283. This instrument has an automatic electrical reset. The counter circuit, in accordance with this invention, is operated by the horizontal synchronizing signals received by the television receiver 11. Since there are 525 horizontal traces on the screen of the tube for each picture frame, there are 525 horizontal synchronizing pulses 30 times per second. Thus, the counter circuit 22 of Figure 2 receives 525 pulses of the horizontal synchronizing signal, at the end of which there is produced a single output pulse.

The single output pulse of the counter circuit 22 at the end of each 525 lines is fed to the trigger circuit 17 in Figure 2, as shown. Since the output of the blocking oscillator 16 causes the trigger circuit 17 to produce a rising or positive pulse, as shown in Figure 3, the pulse of the counter circuit 22 which is the next pulse received by the trigger circuit causes that circuit to produce a falling or negative pulse. This operation may be seen by referring to Figure 3, in which the output pulses of the blocking oscillator are illustrated at 23 and the output pulses of the counter circuit are illustrated at 24. As may be seen, the pulses produced by the two circuits 16 and 22 are received by the trigger circuit 17 consecutively and alternately. Thus the pulse of the blocking oscillator circuit 16 causes one reversal of the trigger circuit 17, while the pulse of the counter circuit 22, which is the next pulse received by the trigger circuit 17, causes the second reversal.

Since the motion picture film is pulled down twenty-four times per second, as previously explained, the television tube must be blanked out twenty-four times per second. Thus, the trigger circuit 17 must operate at a 24 cycle per second rate. It follows, therefore, that the output of the blocking oscillator 16 and also the counter circuit 22 must be twenty-four pulses per second.

In order that this 24 cycle rate may be obtained, there is provided a second trigger circuit 25, illustrated in Figure 2 which, like the first trigger circuit 17 may be a standard flip-flop type circuit square wave generator well known in the art. The circuit 25 is triggered by the output pulse of the counter circuit 22 and also by a frequency divider circuit 26 which provides a second consecutive pulse for reversing the output of the trigger circuit 25, as explained above in connection with the operation of trigger circuit 17.

The frequency divider circuit 26 is a standard and well known circuit which, like the counter circuit 22, will produce one pulse output for a plurality of input pulses. A frequency divider circuit of the type which can be used also is disclosed in Schlesinger Patent No. 2,350,536, in which pulses of 31,500 cycles per second (doubling 15,750) are divided down to 60 cycles per second, and a patent to Maurer et al. No. 2,486,717 in which pulses of 60 cycles per second are divided down to pulses of 24 cycles per second. The circuit 26 is designed to be fed by the horizontal synchronizing pulses from the television receiver 11 which occur at a 15,750 cycle rate (525 lines per frame, 30 frames per second).

While the circuit 26 is described as a frequency divider circuit, this circuit may also include a multiplication or well known doubling circuit in order to derive the necessary dividing factors to produce a 24 cycle per second output from the 15,750 cycle input. This operation and the necessary circuits therefor are well understood by those skilled in the art.

The pulse output of circuit 26, occurring at a 24 cycle per second rate, is fed to the trigger circuit 25 to cause it to be triggered or operate at a 24 cycle rate. The output of the trigger circuit 25 is fed back to the gating circuit 15. This output of circuit 25 is of the same nature as the output of trigger circuit 17, illustrated in Figure 3. Such a wave form operating on the gating circuit 15 will cause the gating circuit 15 to pass the horizontal synchronizing pulses received from the television receiver 11 for a predetermined period of time, then cut off the horizontal synchronizing pulses during the negative going portion of the pulse received from the trigger circuit 25. Since the wave form of the output of circuit 25 is of the nature illustrated in Figure 3, it will be seen that the gating circuit 15 will pass 525 horizontal synchronizing pulses to the counter circuit 22 and the blocking oscillator 16. It will then be cut off for a short period determined by the length of the negative pulse from the trigger circuit 25, following which it will again pass 525 horizontal synchronizing pulses. The first horizontal synchronizing pulse fires the blocking oscillator 16 which, in turn, applies its pulse to the trigger 17. The negative portion of the output of trigger circuit 25 closes the gating circuit 15 so that no more horizontal synchronizing pulses can reach the counter circuit 22 or the blocking oscillator 16. After a fraction of a second the next 24 cycle pulse from the frequency divider circuit 26 reverses the trigger circuit 25, so that it is positive going, starting the second cycle. Thus, the gating circuit controls the timing of the blocking oscillator 16 and the counter circuit 22 for activating trigger circuit 17 at a 24 cycle per second rate, synchronized with the horizontal synchronizing pulses of the horizontal scanning lines of the tube.

A complete television frame of 525 lines is scanned in one thirtieth of a second. During this time the motion picture film must remain stationary in the camera gate. At the end of this scanning period the tube may be blanked out and the film pulled down to the next frame. A standard motion picture frame period is one twenty-fourth of a second. A simple arithmetical operation will show that in one twenty-fourth of a second, 656¼ lines are transmitted in a standard television transmission; that is, in every motion picture frame a total of 656¼ television lines scan the tube. Since one television frame comprises 525 lines, it is apparent that 131¼ lines must be discarded for every motion picture frame. These lines are discarded during the film pull down time by blanking out the screen of the cathode ray tube during this period.

On the first cycle of the wave 18 of Figure 3, representing the blanking pulse, 131¼ lines will be blanked out. After two cycles, 262½ lines will have been blanked out. It will be apparent that the beginning of the second television frame will appear a quarter line from the beginning of the horizontal trace on a television tube, and on the next cycle it will be a half line. This progression normally would continue until the beginning of the frame reaches the end of the line, at which time the process would be repeated. Thus, the start of the television frame would not always occur at the edge of the picture but would, in fact, travel across the picture. To overcome this inherent difficulty, the blanking period must have a variable time. Strictly speaking, in order to keep the exposed time exactly 525 lines, the blanking out time should be 131 lines for three cycles and 132 lines for the fourth. With this arrangement, the scanning will always start at the edge of the picture. The same effect can be had by applying the two sets of pulses 23 and 24, shown in Figure 3, from the blocking oscillator 16 and the counter circuit 22, respectively to the trigger circuit 17 as described. With the circuit shown, operating at twenty-four cycles per second, the average blanked out time is 131¼ lines but, in fact, the precise timing can vary between 131 and 132 lines.

With this arrangement, a complete television frame of 525 lines is exposed to one motion picture frame. An average of 131¼ lines of succeeding television frames is blanked out during the pull down time of the motion picture camera. Five hundred and twenty-five lines of television scanning are then exposed to the succeeding motion picture frame and, again, an average of 131¼ lines are blanked out. The television horizontal line starts at the edge of the frame when each motion picture frame is exposed. There is no retrace occurring on the television screen during any one exposure of a motion picture frame. Taken over an average of four motion picture frames, the television frame corresponds with the motion picture frames. Precise synchronization is obtained, since the entire operation is controlled by the synchronizing pulse originating at the television transmitter without variation in synchronization due to local power frequency conditions or mechanical oscillations introduced by the camera. The result is a clean and commercially satisfactory motion picture reproduction of the television image.

In order to insure complete system synchronization it is also desirable, although it may not always be essential, to synchronize the pull down period of the motion picture film with the television signal. The standard motion picture camera operates from a three-phase alternating current motor running from the local power lines. Since the speed of the motor is a direct function of the applied driving voltage frequency, the operation of the camera, including the pull down period for each frame, is controlled by the frequency of the local power supply. Under certain conditions the standard synchronization between the frequencies of the power supplies of the different localities may be sufficient to avoid synchronizing difficulties between the pull down period of the motion picture film and the blanking out period of the television cathode ray tube. However, it has been found, under other conditions, that it is desirable to provide a method to synchronize precisely the movement of the motion picture film in the camera with the blanking out of the television tube.

In accordance with this invention, such synchronization is obtained by controlling the frequency of operation of the motor furnishing the power for the camera by means of the synchronizing pulses received by the television receiver from the transmitter. In this way, complete synchronization is obtained between all elements involved of the synchronizing pulses originating at the television transmitter.

As may be seen in Figures 1 and 2, a portion of the horizontal sync pulses is selected from the frequency divider 26, of the synchronizing circuit 14 and fed to a synchronizing and inverter circuit 31. The inverter circuit 31 generates a three phase A. C. wave synchronized with the horizontal traces of the television tube and supplies the necessary power for operation of a motor 32 for the camera 13.

One of the pulse frequency rates available in the frequency divider circuit 26 of Figure 2 is that of 120 cycles per second. It is preferred to tap off from this portion of the divider circuit 26 the pulses occurring at the 120 cycle rate. This tap is the connection for the selected sync pulses which may be fed to the pulse steepening circuit 33 in Figure 4.

Figures 4, 5:
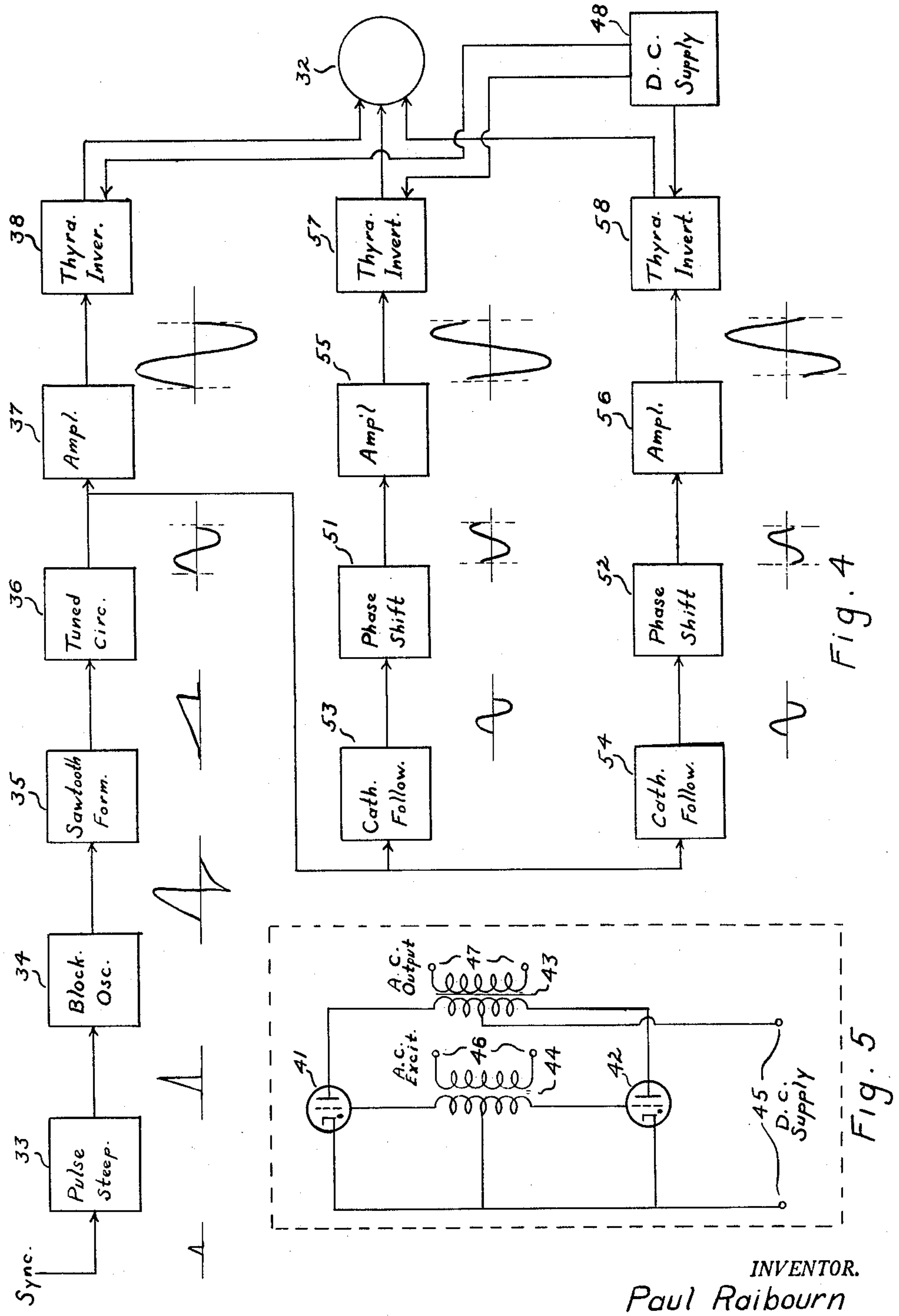
Figure 4 is a diagram in block form of the circuit operating from the horizontal synchronizing pulses of the television receiver of Figure 1 for controlling the camera of Figure 1.
Figure 5 is a schematic wiring diagram of the inverter portion of Figure 4.

The nature of the circuit 31 is shown in more detail in Figure 4. Again, each of the individual circuits involved in the combination is illustrated in block diagram form, since each in itself is well known in the art.

The sync pulses from the frequency divider 26 are fed to a circuit 33 for sharpening or steepening the form of the pulse. Such a pulse steepener circuit is illustrated on page 87 of the Brainard book referred to previously. The pulse output of circuit 33 is then fed to a blocking oscillator circuit 34 for producing a pulse of greater amplitude. The circuit 34 is again the standard single swing blocking oscillator circuit as illustrated in the Fink book. By its very nature as well understood by those skilled in the art, the blocking oscillator circuit 34 may also include a divider characteristic so that the 120 cycle pulse rate is reduced to 60 cycles. The 60 cycle rate constitutes the frequency of operation of the three phase A. C. wave for operating the motion picture film camera. Such a circuit is preferred, though other circuits for producing a pulse may be suitable. The output of circuit 34 is fed to a circuit 35 for generating a sawtooth wave. Such a sawtooth generator is illustrated on page 188 of the Brainard book. Any standard circuit for generating a sawtooth wave from a pulse input is suitable. A sawtooth wave at this point is preferred, because of the various wave shapes of comparable simplicity of generation, the sawtooth has the highest fundamental frequency component. The importance of this is apparent when it is realized that it will be used to generate a sinusoidal voltage of fundamental frequency for driving a thyratron type inverter.

The sawtooth wave type of circuit 35 is fed to a standard tuned circuit 36, the output of which will be a sinusoidal wave of a frequency dictated by the frequency of the television synchronizing pulses. A tuned circuit of this type is illustrated on page 10 of the Brainard book. The output of circuit 36 may be amplified in a standard amplifier circuit 37, which may be of the type disclosed on page 87 of the Brainard book. The wave shape of the output of each of the above circuits is illustrated in Figure 4 by illustrations accompanying each block.

The sinusoidal wave output of circuit 37 is fed to a thyratron inverter. Other inverter circuits may be satisfactory, but a thyratron has been found to be preferable.

The thyratron inverter 38 is shown in the schematic diagram of Figure 5. The circuit preferably comprises two thyratron tubes 41 and 42 having their anodes connected to opposite ends of the secondary coil of a transformer 43 and their control grids connected to opposite ends of the secondary coil of transformer 44. The cathodes of the thyratron tubes are connected together to the center tap of the secondary coil of transformer 44 and to one side of a standard D. C. supply source having terminals 45. The other side of the D. C. supply is connected to the center tap of the secondary of transformer 43. The primary of transformer 44 is connected to terminals 46 which may be the source of A. C. excitation for the thyratron tube operation. The primary of transformer 43 is connected to terminals 47 which comprise the A. C. output of the inverter, which is adequate to meet the power requirement of the camera motor.

The terminals 45 are connected to any source of D. C. power satisfactory for operation of the inverter as a power supply in a well known way. The D. C. supply is illustrated at 48 in Figure 4. The terminals 46, comprising the source of A. C. excitation for the thyratron tubes, are the terminals which are connected to the output of the amplifier circuit 37 of Figure 4. The A. C. output terminals 47 furnish the connections to the motor 32, for operating the camera 13.

Since it is usual and preferable to use a three phase A. C. motor for operation of the camera, it is necessary to provide phase shifting circuits in order to obtain the three phase power supply for operation of the motor 32. Thus, a portion of the output of tuned circuit 36 (Figure 4) is fed to phase shifting circuits 51 and 52 through cathode follower circuits 53 and 54, respectively. Typical cathode follower circuits are shown at page 221 of the Brainard book identified previously. The cathode follower circuits are for purposes of isolation to avoid interaction between the phase shifting circuits 51 and 52. Phase shifting circuits 51 and 52 may be standard circuits which will provide a phase shift of plus 120 degrees and minus 120 degrees from the A. C. output of circuit 37. Phase shifting circuits of this type may be found on page 217 of the Brainard book. The output of the phase shifting circuits 51 and 52 may then be amplified by standard amplifying circuits 55 and 56, respectively, the outputs of which, in turn, are fed, respectively, to thyratron inverter circuits 57 and 58. The amplifier circuits 55 and 56 may be of the type illustrated on page 87 of the Brainard book. The inverter circuits 57 and 58 may be identical to the circuit 38 illustrated and described in Figure 5. The outputs of the three inverter circuits 38, 57, and 58 may then be utilized as the source of three phase A. C. power for the motor 32.

In view of the fact that the three phase A. C. waves used in operating the motor 32 are derived or generated by the synchronizing pulses received by the television receiver, it follows that the motor 32, and, thus, the camera 13 will operate precisely in synchronism with the synchronizing signals transmitted by the television transmitter.

Figure 6:
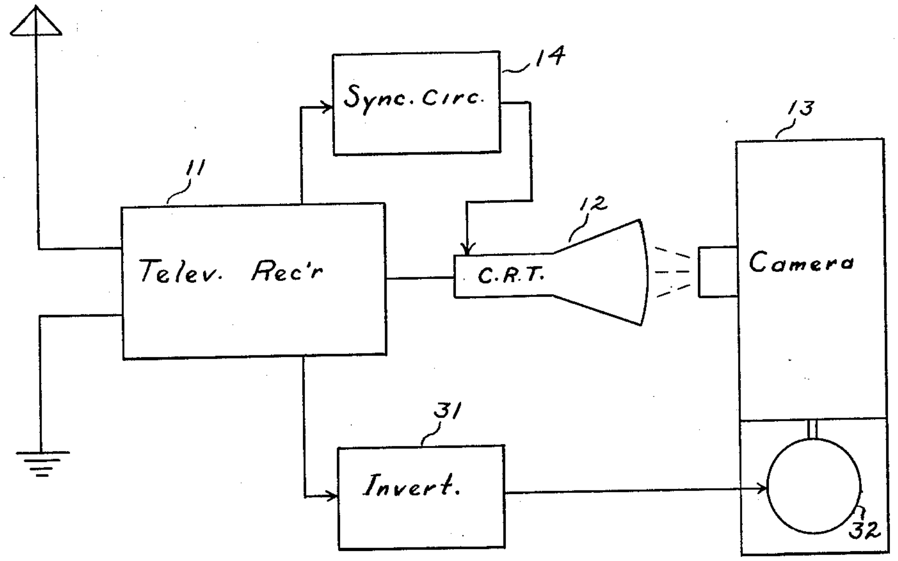
Figure 6 is a modification of the system illustrated in Figure 1.

It will be apparent that the vertical synchronizing pulses received by the television receiver may be utilized to generate the A. C. wave for operating the inverter if preferred. The vertical synchronizing pulses are received at a 60 cycle, the field frequency rate. Thus these vertical synchronizing pulses may be fed directly from the receiver to the pulse steepening circuit 33 of Figure 4. This modification in which the vertical synchronizing pulses are used in place of the horizontal synchronizing pulses as described above, is illustrated in Figure 6.

Since the vertical sync pulses are at the 60 cycle rate, the blocking oscillator circuit 34 should be adjusted so that there is a one to one frequency transmission characteristic. Thus the 60 cycle pulse input will pass through the blocking oscillator circuit 34 at the 60 cycle rate. These pulses are then fed to the circuits illustrated in Figure 4 in the same manner described above. In this way, the vertical sync pulses received by the television receiver serve as the synchronizing means for operation of the motion picture camera motor 32.

In the practical application of the above described system, it has been found desirable that a cathode ray tube be used which has a screen of short persistence characteristic. It is preferred that the screen have a decay time to a point below film inertia which is less than nine micro seconds, or the television signal horizontal blanking time, whichever is shorter. The persistency of a cathode ray tube is that characteristic in which the image continues due to phosphorescence on the screen of the cathode ray tube after the activating impulse of the cathode ray beam has ended.

While the particular circuits illustrated are preferred, it will be apparent that other similar electrical circuits may be suitable for accomplishing the same results. Thus, it is apparent that while a preferred form has been illustrated and described, many modifications may be made without departing from the scope of the invention. For example, a system so synchronized applies not only to conventional motion picture camera design of pull down mechanism, but can also be applied to a type of camera whose pull down action is independently actuated by means of a step motor or precision relay which in turn is triggered by the pulse derived from the television sync pulses. Furthermore, while the counter-circuit has been described as producing a single output pulse in response to a plurality of input pulses, it will be apparent to those skilled in the art that the counter-circuit may produce groups of output pulses activated by selected portions of the input pulses.

Thus, there has been illustrated and described a system for transforming variable recurrent complex signals into variable recurrent signals of predetermined desired recurrency rates.

What is claimed is:

1. An apparatus for recording at selected time intervals received television images in which the images displayed on a cathode ray tube screen are projected on an intermittently actuated film strip comprising, signal generator means operable to generate signals at predetermined time intervals, means controlled by said generated signals for initiating the illumination of the cathode ray tube screen and means controlled by the received television horizontal synchronizing signals for terminating such illumination after a time interval corresponding to the time required to receive one complete television picture.

2. An apparatus for recording at selected time intervals received television images in which the images displayed on a cathode ray tube screen are projected on an intermittently actuated film strip comprising, counter means controlled by successive received television horizontal synchronizing signals for terminating the illumination on the cathode ray screen after such number of horizontal synchronizing pulses have been impressed thereon as are contained in the scan of one complete television picture, signal generator means operable to generate signals at predetermined time intervals and means controlled by said generated signals to initiate the illumination of the cathode ray tube screen and for initiating the operation of said counting means.

3. Apparatus for varying the recurrent rate of reproduction of a complex signal originally transmitted at a given recurrent rate and having periodic control pulses, comprising means for receiving said signal, a reproducing circuit, a first electronic pulse producing circuit connected to said means to be activated by said periodic pulses, an electronic counter circuit connected to said means to count said periodic pulses and generate new pulses at a different predetermined and desired frequency and a second electronic pulse producing circuit connected to and activated by said first circuit and also connected to and having an output of electrical energy having a duration determined and controlled by said counter circuit, said second circuit being connected also to said reproducing circuit to vary the excitation thereof and thereby vary the recurrent rate of reproduction of said complex signal.

4. Apparatus for varying the recurrent rate of reproduction of television images comprising a receiver having means for reproducing said images, an electronic counter circuit connected to said receiver and actuated by the synchronizing pulses received thereby to produce a single pulse for a plurality of horizontal synchronizing pulses constituting a complete television frame, and an electronic pulse generator connected to and activated by the output of said counter circuit and to said means, to blank out said images periodically for a period of time less than that of one television frame.

5. Apparatus for recording television images on a motion picture film operating at a predetermined frame rate, comprising a television receiver having a cathode ray tube for reproducing said images, an electronic counter circuit connected to said receiver and activated by the synchronizing pulses received thereby to produce a single pulse for a plurality of synchronizing pulses constituting a complete television frame and an electronic pulse generator connected to said counter circuit and activated by the output therefrom and to said cathode ray tube to produce a signal for blanking out the television image on said tube periodically at the motion picture frame rate for a period of time less than that of one television frame.

6. In a system for recording a television image on a motion picture film, operating at a predetermined frame rate apparatus comprising in combination a television receiver, means for blanking out the image reproduced by said television receiver at the motion picture frame rate for a period of time less than that of a television frame, and an electronic counter circuit connected to said means and to said receiver and activated by the synchronizing pulses received thereby to produce one pulse for a plurality of synchronizing pulses constituting a complete television frame for controlling said blanking.

7. In a system for recording a television image on a motion picture film, apparatus comprising in combination, a television receiver, means for blanking out the television image, a pulse generating electronic circuit connected to said receiver and activated by the first of a series of pulses equal in number to the synchronizing pulses constituting a television frame received by said receiver, and a second pulse generating electronic circuit connected to said receiver and producing a pulse at the time of the last of said series of pulses, said first and second electronic circuits being connected to and controlling said blanking means.

8. Apparatus for recording a television image on a motion picture film operating at a predetermined frame frequency, comprising in combination a television receiver having a cathode ray tube, a gating circuit connected to said receiver for selecting a portion of the horizontal synchronizing pulses received thereby, a pulse counter circuit connected to said gating circuit for generating a single pulse after a plurality of pulses constituting a television picture frame, a second pulse producing circuit connected to and activated by the television synchronizing pulses passed by said gating circuit for producing pulses of a frequency equal to the frame frequency of said motion picture film, a trigger circuit connected to said tube and also connected to and controlled by said pulse counter circuit and said second pulse producing circuit, and generating pulses for periodically blanking out the image of said cathode ray tube, and a second trigger circuit connected to and activating said gating circuit at a frequency corresponding to the frame frequency of said motion picture film.

9. Apparatus for synchronizing the elements of a television photographic system which comprises a receiver having a cathode ray tube, a gating circuit connected thereto for passing a number of television synchronizing pulses corresponding to a television frame, a first pulse generating circuit connected to said gating circuit and triggered by the first of said television synchronizing pulses passed thereby, a counter circuit connected to said gating circuit and generating a single pulse at the end of a predetermined number of synchronizing pulses constituting a television frame, and a second pulse generating circuit for controlling the excitation of said cathode ray tube, said second pulse generating circuit being connected to and activated by the output of said first pulse generating circuit and connected to and deactivated by the output of said counter circuit.

10. The apparatus according to claim 9 including a frequency divider circuit connected to said receiver for generating pulses for timing said gating circuit.

11. In a system for recording a television image on a motion picture film operating at a predetermined frame frequency, apparatus comprising in combination a television receiver, a counter circuit connected to receive television synchronizing pulses from said receiver and generating a single pulse after a plurality of television synchronizing pulses constituting a television picture frame, a pulse generating circuit connected to receive television synchronizing pulses from said receiver and producing pulses at a frequency equal to the frame frequency of said motion picture film, and electronic blanking means connected to each of said circuits and activated by the output of each thereof and producing a signal periodically at the motion picture frame rate having a duration less than that of a television picture frame, for blanking out the image reproduced by said television receiver.

12. Apparatus for recording television images on motion picture film, comprising a television receiver having a cathode ray tube, a motion picture camera, and an electrical power inverter circuit connected to said camera and to said television receiver and activated by the synchronizing pulses received by said receiver for generating an A. C. wave for operating said camera, said power circuit comprising a tuned circuit and a pair of phase shifting circuits to provide waves respectively out of phase with each other and with that in said tuned circuit whereby three-phase A. C. power is provided.

13. Apparatus for recording a television image on a motion picture film comprising in combination a television receiver and a motion picture camera, an electrical power inverter circuit for generating power to operate said motion picture camera, and an electronic pulse producing circuit connected to said television receiver and activated by the synchronizing pulses received thereby and to said electrical power circuit for controlling the frequency thereof, said power circuit comprising a tuned circuit and a pair of phase shifting circuits to provide waves respectively out of phase with each other and with that in said tuned circuit whereby three-phase A. C. power is provided.

14. In a system for recording a television image on a motion picture film operating at a predetermined frame rate, said system having means for presenting and blanking said image, the method of synchronizing the presentation of said image with the movement of said film, which consists in selecting the horizontal synchronizing pulses of the television signal, counting a predetermined number of said pulses periodically at said predetermined frame rate and utilizing said counted pulses for producing a control signal to time the presentation and blanking of said image to present a complete television image recurrently at said predetermined rate different from the original recurrent rate of said television image.

15. In a system for recording onto a motion picture film a television image on a cathode ray tube having means for controlling the time of blanking thereof, the method of synchronizing the blanking of said tube with the movement of said film which consists in selecting the horizontal synchronizing pulses of the television signal, counting said pulses, utilizing said counted pulses to generate a single pulse after counting a plurality of pulses constituting the number comprising a television frame, and utilizing said generated pulse to control the time of blanking of the cathode ray tube.

16. The method of synchronizing the television image reproduction rate with film movement in a television photographic system having means to control the excitation of the cathode ray tube presenting said image which consists in selecting the synchronizing pulses of the television signal during the period that the motion picture film is stationary, rejecting said synchronizing pulses during the period said motion picture film is in motion between motion picture frames, counting said pulses, utilizing the first of said synchronizing pulses which have been counted to control the time of excitation of the television cathode ray tube to present a complete television frame signal image, generating a second control signal after a plurality of synchronizing pulses constituting a television frame have been counted, and utilizing said second control signal to control the time of blanking said tube and prevent excitation thereof, thereby to cause said tube to present a television signal image during the period the motion picture film is stationary and blank out said tube during the period said film is moving between frames.

17. In a system for recording a television image on a film in a motion picture camera, the method of synchronizing the presentation and blanking of said television image with the movement of said film which consists in selecting the horizontal synchronizing pulses of the television system, counting said pulses, generating a single pulse after counting a plurality of pulses constituting a television frame, applying said generated pulse to the cathode ray tube to control blanking thereof, additionally utilizing said synchronizing pulses to generate an A. C. wave, shifting the phase of a portion of said wave to derive three-phase A. C. power and applying said three-phase A. C. power to said camera.

18. The method of recording received television images in which the images displayed on a cathode ray tube screen are projected on an intermittently actuated film strip which comprises, generating signals at predetermined time intervals, initiating illumination of the cathode ray screen by said generated signals, counting a number of received television horizontal synchronizing signals equivalent to the scan of one complete television picture, producing a signal at the completion of said count, and terminating the illumination of said cathode ray screen by said last-mentioned signal.

References Cited in the file of this patent

UNITED STATES PATENTS

| | | |
|---|---|---|
| 1,979,484 | Mathes | Nov. 6, 1934 |
| 2,175,033 | Schlesinger | Oct. 3, 1939 |
| 2,251,786 | Epstein | Aug. 5, 1941 |
| 2,275,898 | Goldsmith | Mar. 10, 1942 |
| 2,301,199 | Bruce | Nov. 10, 1942 |
| 2,373,114 | Goldsmith | Apr. 10, 1945 |
| 2,404,839 | Hammond | July 30, 1946 |
| 2,414,319 | Milholland | Jan. 14, 1947 |
| 2,420,029 | Brady | May 6, 1947 |
| 2,430,547 | Anderson | Nov. 11, 1947 |
| 2,468,256 | Espley | Apr. 26, 1949 |

FOREIGN PATENTS

| | | |
|---|---|---|
| 442,747 | Great Britain | Feb. 14, 1936 |